Patented Oct. 16, 1951

2,571,639

UNITED STATES PATENT OFFICE 2,571,639

PHENYLATION OF METHACRYLIC ACID

Immanuel J. Wilk, Evanston, and Marvin A. Spielman, Waukegan, Ill., assignors to Abbott Laboratories, North Chicago, Ill., a corporation of Illinois No Drawing. Application December 20, 1949, Serial No. 134,136

10 Claims. (Cl. 260—515)

This invention relates to a process for the phenylation of methacrylic acid, and more particularly is directed to a method for phenylating the α-carbon atom of methacrylic acid in the presence of a catalyst.

The phenylation of methacrylate esters in the presence of aluminum chloride catalyst produces a new and unexpected result as the phenyl ring is added to the alpha carbon atom instead of the predicted beta position. By using an ester of methacrylic acid derived from an alcohol of two or more carbon atoms, α-phenylisobutyric acid is obtained directly.

In general, the process of the invention is performed by reacting an alkyl ester methacrylate with benzene in the presence of a catalyst.

In more specific detail, the process of the invention may be illustrated by the following examples:

Example I

To about 3 mols of ethyl methacrylate dissolved in about 26 mols of dry benzene, is added about 5.25 mols of anhydrous aluminum chloride with constant stirring. During the addition of the aluminum chloride, the temperature of the mixture is kept around 55–60° C. After the addition of the aluminum chloride is completed, the temperature of the reaction mass is kept at about 60° C. for about 40 hours, with constant stirring. The reaction mixture is then poured into about 100 mols of ice-9 mols hydrochloric acid mixture. The addition to the ice mixture is done with constant and thorough stirring. The two layers which form are separated, and the benzene layer is washed with about 100 mols of water. The benzene is removed from the non-aqueous fraction by vacuum distillation, and the residue is cooled. The precipitate which is formed is filtered out and is dissolved in 10% sodium hydroxide, and the solution is filtered. The alkaline solution is then carefully acidified with hydrochloric acid, and the precipitate which forms is filtered out and dried. The product is α-phenylisobutyric acid, melting point 72–73° C.

Example II

To about 9 mols of methyl methacrylate dissolved in about 68 mols of dry benzene, are added slowly and with constant stirring 15.75 mols of anhydrous aluminum chloride. The addition of the aluminum chloride should take place over a period of about 3 hours, and the temperature kept at about 60° C. After the completion of the addition of aluminum chloride, the reaction mixture temperature is raised to reflux temperature (about 82° C.) for about 4 hours with continued stirring. At the end of the reflux period the mixture is cooled and poured on an ice-concentrated hydrochloric acid mixture (as per Example I). The two layers which are formed are separated, and the benzene layer is washed with water. The benzene is removed from the benzene phase by vacuum distillation. The residue is distilled at 10 mm. of mercury and the product, methyl α-phenylisobutyrate, is recovered as a fraction that distills at 103–106° C. α-Phenylisobutyric acid may be recovered by alkali hydrolysis of the methyl α-phenylisobutyrate.

Example III

Following the procedure of Example I, 1.8 mols of anhydrous benzene, 0.3 mol of n-butyl methacrylate, and 0.53 mol of anhydrous aluminum chloride are allowed to react, and α-phenylisobutyric acid is recovered.

Example IV

Following the procedure of Example I, 1.8 mols of anhydrous benzene, 0.3 mol of n-octyl methacrylate, and 0.53 mol of anhydrous aluminum chloride are allowed to react and the mixture is worked up to produce α-phenylisobutyric acid.

The temperature of the reaction of the methacrylate benzene in the presence of aluminum chloride should be maintained between 40° C. and the reflux temperature, which is about 82° C. Obviously, the lower the temperature the longer the time of reaction, and conversely, the higher the temperature the less time of reaction is required. It is not desirable to carry out the reaction below 40° C. as the time of reaction would be prohibitably long.

The catalyst, aluminum chloride, is used in amount of 1.25 to 2 mols per mol of the methacrylate. The desired ratio is 1.75 mols of aluminum chloride per mol of the methacrylate. Below the one molar ratio the desired reaction does not occur.

The catalyst required for the reaction must be a strong electrophilic catalyst such as aluminum chloride, boron trifluoride, hydrofluoric acid, etc. Weaker catalysts such as ferric or zinc chloride will not catalyze the reaction.

Others may readily adapt the invention for use under various conditions of service, by employing one or more of the novel features disclosed or equivalents thereof. As at present advised with respect to the apparent scope of our invention, we desire to claim the following subject matter.

We claim:

1. In the process of phenylating the α-carbon atom of methacrylic acid, the step which comprises reacting an alkyl ester of methacrylic acid with benzene in the presence of a catalyst selected from the class consisting of aluminum chloride, boron trifluoride and hydrofluoric acid.

2. In the process of phenylating the α-carbon atom of methacrylic acid, the step which comprises reacting an alkyl ester of methacrylic acid with benzene in the presence of aluminum chloride.

3. In the process of phenylating the α-carbon atom of methacrylic acid, the step which comprises reacting an alkyl ester of methacrylic acid with benzene in the presence of aluminum chloride, at a temperature of at least about 40° C.

4. In the process of phenylating the α-carbon atom of methacrylic acid, the step which comprises reacting an alkyl ester of methacrylic acid, in which the ester radical contains from 1 to 8 carbon atoms, with benzene in the presence of at least about 1.25 mols of aluminum chloride per mol of the methacrylic acid ester, said reaction being carried out at temperature of at least about 40° C.

5. The process of producing α-phenylisobutyric acid which comprises reacting ethyl methacrylate with benzene in the presence of at least about 1.25 mols of aluminum chloride per mol of the methacrylate.

6. The process of producing α-phenylisobutyric acid which comprises reacting butyl methacrylate with benzene in the presence of at least about 1.25 mols of aluminum chloride per mol of the methacrylate.

7. The process of producing α-phenylisobutyric acid which comprises reacting octyl methacrylate with benzene in the presence of at least about 1.25 mols of aluminum chloride per mol of the methacrylate.

8. The process according to claim 5 which reaction is carried out at a temperature of at least about 40° C.

9. The process of producing α-phenylisobutyric acid which comprises reacting methyl methacrylate with benzene in the presence of catalytic amounts of aluminum chloride, and the hydrolysis of the resulting methyl α-phenylisobutylate.

10. The process of producing α-phenylisobutyric acid which comprises reacting methyl methacrylate with benzene in the presence of at least about 1.25 mols of aluminum chloride per mol of the methyl methacrylate at a temperature of at least about 40° C., and hydrolysis of the resulting methyl α-phenylisobutylate to form the α-phenylisobutyric acid.

IMMANUEL J. WILK.
MARVIN A. SPIELMAN.

REFERENCES CITED

The following references are of record in the file of this patent:

UNITED STATES PATENTS

| Number | Name | Date |
| --- | --- | --- |
| 2,246,762 | Schirm | June 24, 1941 |
| 2,275,312 | Tinker et al. | Mar. 3, 1942 |
| 2,475,916 | Reiff et al. | July 12, 1949 |

OTHER REFERENCES

Koelsch et al., J. Am. Chem. Soc., vol. 65, pp. 50–60 (1943).